INVENTOR:
ARTHUR FRIESEN

United States Patent Office 3,195,664
Patented July 20, 1965

3,195,664
TRANSPORTER FOR ENDLESS TRACK
VEHICLES
Arthur Friesen, Virden, Manitoba, Canada
Filed Jan. 9, 1964, Ser. No. 336,796
Claims priority, application Canada, Jan. 9, 1963, 690,881
4 Claims. (Cl. 180—1)

My invention relates to new and useful improvements in transporters for endless track vehicles, particularly endless track vehicles of the earth moving type which includes a bulldozer type blade at the front end thereof.

Due to the extreme weight and relatively slow forward motion of these vehicles, it is conventional to transport them from one place to another upon a lowbed trailer, said lowbed trailer having a drive unit upon the front end thereof.

However, it will be appreciated that either the drive unit waits at the site until the earth moving vehicle has completed the job or it has to return to the site in order to pick up the vehicle thus entailing two trips. While this may not be too important if the distance between sites is relatively small, nevertheless it becomes extremely expensive when the distance between sites is considerable. Not only is it expensive for the maintenance in running of the lowbed trailer but it is uneconomical if this lowbed trailer is standing idle between movements of the prime vehicle.

I have overcome these disadvantages by providing a relatively simple, wheel chassis adapted to receive the endless track vehicle thereon and to derive its motive power from the endless track vehicle, suitably geared to give an economical forward speed to the transporter.

The principal object and essence of my invention is therefore to provide a device of the character herewithin described which derives its motive power from the vehicle being carried thereby.

Another object of my invention is to provide a device of the character herewithin described which includes means whereby the main load is relieved from the tracks of the vehicle, thus relieving strain on the drive tracks of the transporter.

A further object of my invention is to provide a device of the character herewithin described which normally requires that the endless tracks of the vehicle being carried, operate in reverse. This is important because normally such endless track vehicles operate in one direction only and by utilizing the reverse gear to provide motive power to the transporter, relatively unused wear and bearing surfaces are utilized.

Another object of my invention is to provide a device of the character herewithin described which is adapted to various sizes of endless track vehicles within limits.

A still further object of my invention is to provide a device of the character herewithin described which incorporates means to locate and anchor the endless track vehicle from the transporter thus taking the thrust of the endless tracks in a safe manner.

A still further object of my invention is to provide a device of the character herewithin described which is extremely simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

Figure 1:
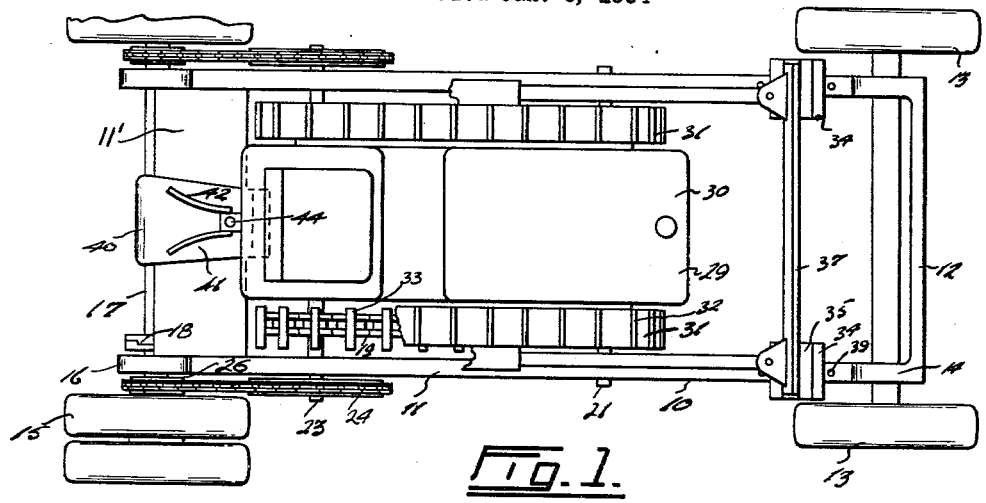
FIGURE 1 is a top plan view of my transporter with an endless track vehicle in position.

Proceeding therefore to describe my invention in detail, the device comprises a substantially rectangular chassis 10 having a pair of spaced and parallel longitudinal side members 11 and transverse cross members 12.

A pair of ground engaging wheels 13 are journalled for rotation upon the front end 14 of the chassis and a pair of ground engaging wheels 15 are journalled for rotation upon the chassis adjacent the rear end 16 thereof. It is preferable that the rear wheels be of the double-wheeled variety as illustrated but this is not essential.

The axle 17 carrying the rear wheels 15 is preferably provided with a device such as dog clutch 18 thus permitting one wheel to turn faster than the other in order to facilitate steering of the transporter.

A pair of drive tracks 19 are mounted within the chassis in spaced and parallel relationship and adjacent each longitudinal member 11. These drive tracks 19 extend around front sprockets 20 journalled upon axle 21 spanning the chassis and around rear sprockets 22 journalled upon axle 23.

Secured to the outboard ends of axle 23 are further sprockets 24, one upon each side thereof, around which extend chains 25. These chains in turn engage around sprockets 26 and secured to the aforementioned rear axle 17 thus providing drive means between the drive tracks 19 and the rear wheels 15.

Supported upon the longitudinal chassis members 11 is a plurality of idler wheels 27 supporting the upper runs 28 of the drive tracks 19.

The endless track vehicle carried by the transporter as indicated by reference character 29 and comprises source of power 30 operatively connected to the endless tracks 31 situated upon each side of the vehicle. This vehicle is mounted upon the chassis by means of conventional ramps (not illustrated) and positioned so that the cleats 32 of the endless tracks 31 engage transverse members 33, situated upon the drive tracks 19. It will therefore be appreciated that if the vehicle 29 is prevented from forward and rearward movement, rotation of the drive tracks 32, by means of the source of power 30 will cause rotation of the drive tracks 19 and hence, through the connecting elements hereinabove described, rotation of the rear ground engaging wheels 15 thus supplying motive power to the transporter.

It will, of course, be appreciated that the entire weight of the vehicle 29 is desirably not carried by the drive tracks 19 and in this connection I provide front and rear means not only to position and anchor the vehicle upon the chassis but to take the majority of the weight thereof.

Upon each longitudinal member 11 and adjacent the front end 14 thereof, is a blade engaging cleat or block 34, being notched as at 35 upon the upper surface thereof to receive the lower blade edge 36 of the associated blade assembly 37 of the vehicle 29.

Pins 38 are secured to the underside of these cleats engageable within selected apertures 39 within the longitudinal chassis members thus giving limited endwise adjustment of the cleats.

Figure 2:
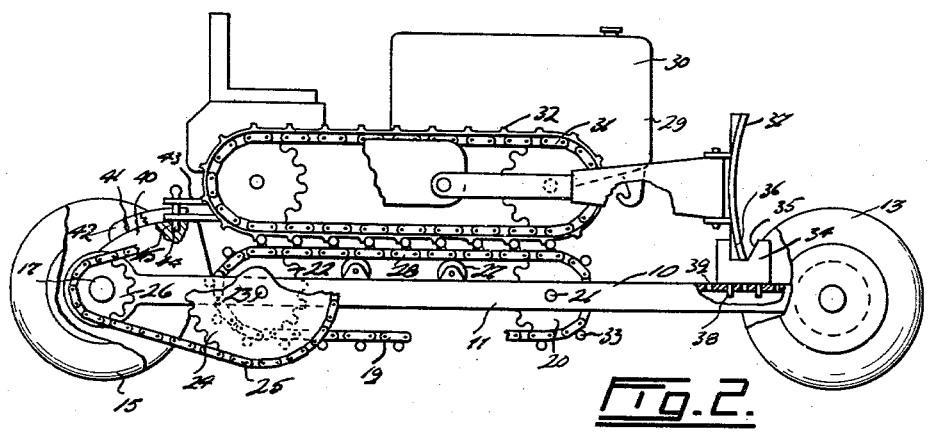
FIGURE 2 is a side elevation of FIGURE 1.

A ramp 40 is mounted centerally between the rear wheels 15 adjacent the rear end 16 of the chassis, in a manner similar to the cleats 34, said ramp having an upper surface 41 inclining upwardly as clearly shown in FIGURE 2. Secured to the upper surface of the ramp is a pair of upwardly and forwardly converging guide flanges 42 adapted to receive the rear hitch 43 of the vehicle as it is driven onto the chassis. The ramp elevates the rear end of the machine and the flanges 42 guide the hitch centrally so that the conventional pin 44, of the hitch 43 drops within an aperture 45 situated adjacent the apex of the flanges 42. This takes the weight of the rear of the vehicle and by the lowering of the blade 37 within the cleats 34, the weight of the front of the vehicle can be transferred to the cleats rather than remaining on the drive tracks 19.

Figure 3:
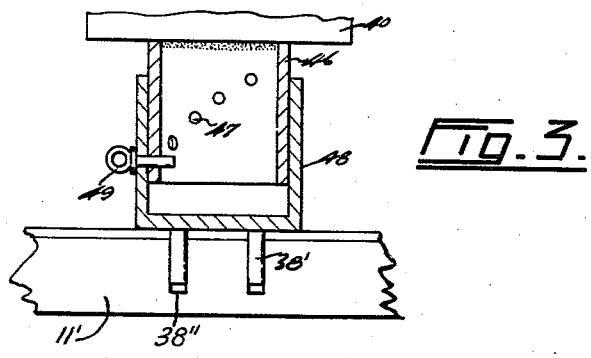
FIGURE 3 is an enlarged sectional view showing the method of vertical adjustment of the rear ramp.

It is, of course, desirable to provide limited vertical adjustment of the ramp 40, and one method of obtaining this adjustment is shown in FIGURE 3. At tubular shaft or cylinder 46 is secured to the underside of the ramp 40 and is provided with a plurality of apertures 47 through the wall thereof in spiral formation as clearly shown. This tube or cylinder nests within a further tube or cylinder 48 having pin 49 extending through an aperture therein and engageable with any one of the apertures 47, thus giving initial adjustment to the height of ramp 40. Pins 38', similar to pins 38, are secured to the underside of cylinder 48 and engage within apertures 38" provided in a cross member 11' spanning the chassis members 11 adjacent the rear axle 17.

In operation, the endless track vehicle is driven up conventional ramps, temporarily located at the rear of the chassis 10 and driven onto the chassis so that the tracks 31 engage the tracks 19. The vehicle is positioned so that the hitch 43 is located upon the ramp 40 as hereinbefore described whereupon the blade 37 is lowered thus taking the weight of the front of the vehicle. By engaging the reverse gear of the endless track vehicle, the endless tracks 31 cause the drive tracks 19 to revolve thus self propelling the transporter. Turns are made in the conventional manner of such vehicles by breaking one or other of the tracks 31 whereupon the dog clutch 18 permits the differential to be applied to the rear wheels 15 thus steering the vehicle.

Alternatively of course, conventional steering could be provided to the front ground engaging wheels 13, if desired.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A transporter for endless track vehicles of the earth moving blade type, comprising in combination a chassis, a pair of ground engaging wheels mounted at the front end of said chassis and a pair of ground engaging wheels mounted at the rear end of said chassis, a pair of spaced and parallel endless drive tracks mounted within said chassis engageable by the cleats of the tracks of the vehicle carried on said chassis, means to mount said drive tracks, means operatively connecting said drive track mounting means to one of said pairs of said ground engaging wheels of said chassis, and means to position and anchor the vehicle carried by said transporter, said means to position and anchor the vehicle carried by said transporter comprising a ramp on said chassis adjacent the rear end thereof and mounted centrally thereon, said ramp including a pair of upwardly converging guide flanges, said ramp adapted to receive the hitch of said vehicle as it is driven onto said chassis, said hitch and the rear end of said vehicle being elevated as it rides up said ramp, and at least one blade engaging cleat adjacent the forward end of said chassis, said cleat having a blade edge engaging notch formed thereon.

2. The device according to claim 1 in which said means to mount said drive tracks comprises a pair of sprockets at the front of said drive tracks and journalled for rotation within said chassis, and a pair of sprockets at the rear end of said drive tracks also journalled for rotation within said chassis, said drive tracks also extending around said front and rear sprockets, idling rollers on said chassis supporting the upper run of said drive tracks and said operatively connecting means including drive connecting means between said rear mounted sprockets and said rear mounted ground engaging wheels.

3. The device according to claim 1 which includes means to adjust said ramp and said cleat endwise on said chassis, within limits, said ramp also including means for vertical adjustment thereof within limits.

4. The device according to claim 2 which includes means to adjust said ramp and said cleat endwise on said chassis, within limits, said ramp also including means for vertical adjustment thereof within limits.

References Cited by the Examiner
UNITED STATES PATENTS 2,309,198   1/43   McCleneghan _____ 180—1 X
2,812,018  11/57  Schrader _____ 180—1 X A. HARRY LEVY, *Primary Examiner.*